Aug. 16, 1966  H. A. PRICE  3,266,628
FLEXIBLE IMPERVIOUS CARTRIDGE FILTER
Filed Feb. 21, 1964
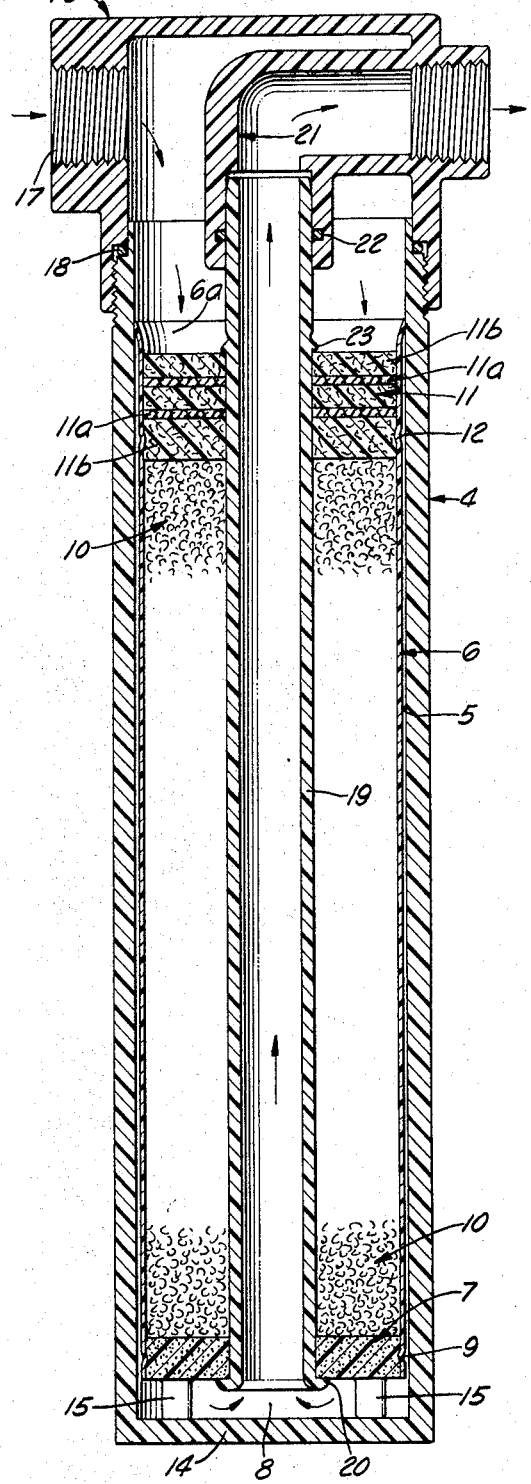
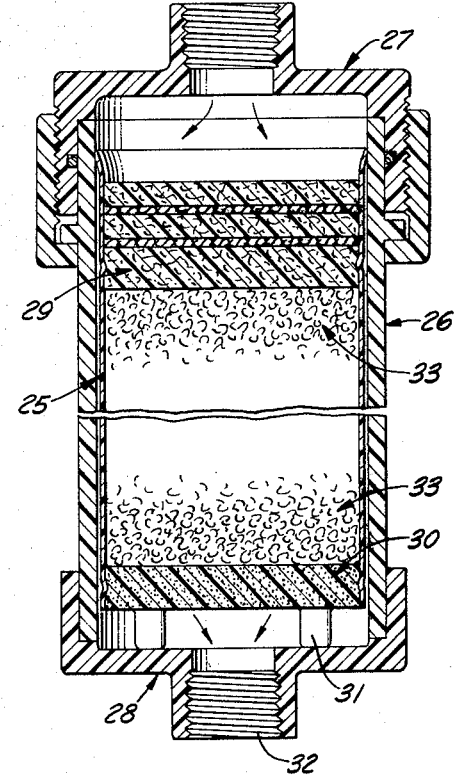
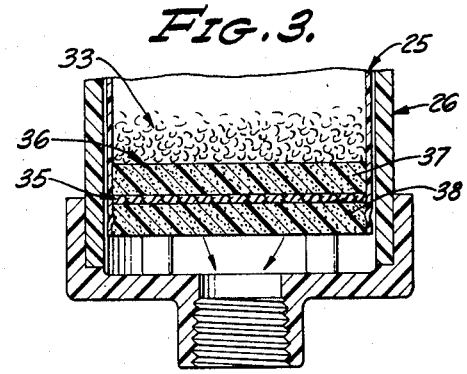
INVENTOR.
HAROLD A. PRICE
BY Paul A. Weilein
ATTORNEY

3,266,628
FLEXIBLE IMPERVIOUS CARTRIDGE FILTER
Harold A. Price, Orange, Calif., assignor to Reid Manufacturing Inc., Long Beach, Calif., a corporation of California
Filed Feb. 21, 1964, Ser. No. 346,581
15 Claims. (Cl. 210—94)

This invention relates to a device for filtering and effecting purification treatments of liquid and gaseous fluids.

It is an object of the present invention to provide a filter device of the character described that constitutes an improvement in the filter art in consideration of providing a particularly novel, simple, and inexpensive construction and arrangement of elements including means which, in response to pressure of fluid being treated in the filter, will regulate the flow of the fluid through the device to assure an effective filtering and purification treatment.

It is another object of this invention to provide a filter device such as described which achieves the above mentioned and other objectives hereinafter set forth by reason of including a tubular filtering cartridge or envelope formed of impervious flexible material and provided interiorly with axially spaced filtering members that confine therebetween in the envelope a body of a filtering medium capable of being impacted and laterally displaced in response to relative movement of the filtering members.

It is another object of this invention to provide a filter device such as next above described wherein the flexible filtering envelope has at one end an intake filtering member fixed thereto in sealing engagement therewith so as to maintain between it and a discharge filtering member at the other end of the envelope, a body of a filtering medium capable of being impacted and laterally displaced. With this arrangement should voids or channels form in the filtering medium and permit rapid discharge of fluid from the envelope, the pressure of fluid against the outer side of the intake filtering member becomes greater than on the inner side thereof and causes this filtering member to move axially inwardly against the body of the filtering medium to impact it and thereby eliminate the voids or channels therein. At the same time, this impaction causes lateral displacement of the filtering medium in a manner effecting a sealing engagement of the surrounding wall of the envelope with the wall of the bore of the housing in which the envelope is mounted. Thus, not only is channeling and loss of desired residence time of fluid in the envelope eliminated, but by-passing of the filtered fluid between the envelope and the housing is prevented and the envelope is maintained in a clean state so that it may be handled conveniently when replaced.

A further object of this invention is to provide a filter device wherein the aforementioned novel filtering envelope is mounted in a tubular housing, the bore of which has a cross sectional shape corresponding to that of the envelope to assure that the envelope will form a seal with a wall of the bore responsive to displacement of the filtering medium in the envelope.

Another object of this invention is the provision of a flexible filtering envelope such as above noted which is transparent whereby visual inspection of the filtering medium therein may be made to ascertain whether or not replacement of the envelope is required.

It is another object to provide a filter device such as described wherein the filtering envelope readily and easily may be installed and replaced by inexperienced persons and wherein the envelope remains in a clean state exteriorly to permit handling without soiling the hands of the person removing the envelope.

Additionally, it is an object of this invention to provide a filter device such as described wherein the wall of the flexible filter envelope is provided with a free end portion extending outwardly beyond the intake filtering element so that in response to pressure of fluid to be filtered directed toward the envelope, the free end portion will provide a circumferential seal against the wall of the bore of the housing supporting the envelope to prevent the fluid from being directed between the outer wall of the envelope and the wall of the bore of the housing.

Other objects and advantages of the invention will be hereinafter described or will become apparent to those skilled in the art, and the novel features of the invention will be defined in the appended claims.

Referring to the drawing:
FIG. 1 is a vertical sectional view of a filter device embodying the present invention;
FIG. 2 is a fragmentary vertical sectional view of a modified form of the filter device; and
FIG. 3 is a fragmentary section of the lower portion of the filter device shown in FIG. 2 as equipped with a different type of filtering member from that shown in FIGS. 1 and 2.

A filter device made in accordance with the present invention includes a rigid housing 4 which in this instance is elongate and cylindrical for removably supporting in the bore 5 thereof an elongate tubular filtering cartridge or envelope 6. This enevlope is formed of flexible and impervious material, for example one of the sheet plastic materials capable of being stretched and which may be somewhat elastic.

The cross sectional shape of the envelope 6 preferably corresponds to that of the bore of the housing in which it is to be mounted, and in this instance the envelope is generally cylindrical and dimensioned so that its cylindrical wall is close to the wall of the bore 5 whereby, as will be hereinafter described, the envelope will form a circumferential seal with the wall of the bore.

It should be noted that the envelope could be somewhat tapered if the bore of the housing is tapered and in all instances should conform to the configuration of the housing in which it is mounted since a filter envelope made in accordance with this invention could be used to advantage in various forms of housings or filter casings for various purifying and filtering purposes.

Fixed in one end of the envelope 6 in sealed engagement therewith is a rigid circular discharge filtering member 7 through which fluid treated in the envelope will pass into an outlet chamber 8 in the housing 4. The material of the envelope 6 may be united with or bonded to the periphery of the filtering member 7 as indicated at 9 by heat sealing or any other means may be employed to fix and seal the member 7 in the envelope.

A body of a suitable filtering medium 10 is confined in the envelope 6 between the discharge filtering member 7 and an intake filtering member 11 bonded to or otherwise fixed in and sealed to the other end portion of the envelope, for example as at 12, in the same manner as the member 7. The filter medium 10 may consist of granular activated charcoal or any other filtering or purifying material that is capable of being impacted and laterally expanded or displaced in response to axial compression thereof within the envelope, the type of filtering material used depending upon the particular fluid to be treated in the filtering device. Likewise, the filtering members 7 and 11 may be of various forms and types with different degrees of porosity depending upon the particular fluid or nature of the fluid to be treated. However, the intake filtering member 11 should have a greater porosity than the discharge filtering medium in order that the fluid entering the envelope will be subjected to treatment therein for the desired length of time to be effectively treated before filtering through the discharge filtering member 11.

Means are provided between the discharge filtering element 7 in the envelope 6 and the end wall 14 which closes one end of the housing 4, as shown in FIG. 1, to space the envelope from the end wall 14 and thereby form the outlet chamber 8. For this purpose the outer side of the discharge filtering element 7 may be provided with feet or projections 15 which will engage the closed end wall 14 and thereby maintain the envelope from that wall.

Any suitable means may be provided for introducing fluid to be tread into the housing 4 so that it will filter through the intake filtering member 11 into the filtering envelope 6. As here shown, a fitting 16 having a port 17 adapted to be connected with a source of supply of the fluid to be treated, not shown, is removably threaded onto the housing and sealed thereon by means of a sealing ring 18.

Any suitable means may be provided for removing the filtered fluid from the outlet chamber 8 in the housing 4. FIG. 1 shows one means of removal of the filtered fluid in the form of a tube 19 extending axially through the envelope and the filtering members 11 and 7. This tube is fixed at one open end thereof in any suitable manner to the outer side of the discharge filtering elements 7 so as to communicate with the outlet chamber 8. As shown in FIG. 1, the lower end of the tube 19 which may be made of plastic material, is flared or flanged outwardly as at 20 and cemented or otherwise secured to the member 7. The member 7 fits tightly around the tube to form a seal therewith. The other open end of the tube 19 extends through and outwardly beyond the intake filtering member 11 so that it may be removably extended into one end of a discharge conduit 21 carried by the fitting 16. An O-ring seal 22 is provided in the conduit 21 to seal against the tube 19. With this arrangement it will be seen that fluid having been filtered through the envelope 6 and reaching chamber 8 will flow upwardly through the tube 19 and out through the discharge conduit 21.

The discharge filtering member 7 is fixed to the tube 19, but the intake filtering member 11, on the other hand, while sealingly engaged with the tube, is subject to axial movement relative thereto. This is permitted by the flexibility of the envelope 6 which obviously must collapse somewhat in permitting the filtering member 11 sealed thereto to move axially against the body of filtering medium 10. Means are provided, however, to restrict movement of the filtering member 11 outwardly relative to the tube 19, and for this purpose, the tube may be staked so as to form an obstruction as at 23 just above the outer side of the member 11.

It should be noted that the wall of the envelope 6 extends outwardly beyond the intake filtering member 11 and is flared as at 6a so that it will be laterally deflected to form a seal with the wall of the bore 5 in response to pressure of the fluid directed against the member 11. This seal prevents the fluid being treated from passing between the envelope and the wall of the bore.

It will now be apparent that relative axial movement may take place between the two filtering members 7 and 11, the member 11 in this instance moving toward the member 7 and this movement is effected in response to differential fluid pressures developed on opposite sides of the member 11. Accordingly, when the member 11 is moved inwardly against the body of filtering material 10, the latter is impacted and thereby caused to expand and become laterally displaced. This expansion or lateral displacement will cause the cylindrical wall of the envelope 6 to be forced laterally into circumferential sealing engagement with the wall of bore 5 of the housing 4 to prevent fluid from passing upwardly from chamber 8 between the wall of the housing 4 and envelope 6.

It should be noted that fluids directed into the filtering device under pressure, after passing through the intake filtering element 11 will develop a pressure between the filtering members 7 and 11 such that in some instances channels or voids may be formed in the body of the filtering material 10 with the result that the fluid under treatment will pass too rapidly through the envelope and thereby shorten the desired residence time of the fluid in the envelope. When this channeling takes place, the pressure on the inside of the filtering member 11 becomes less than the pressure on the outer side thereof with the result that the filtering member will move inwardly and compress the body of the filtering medium 10, thereby impacting it and eliminating the voids and channels and at the same time expanding or laterally displacing the material so that the surrounding wall of the envelope is forced tightly into sealing engagement with the wall of the bore of the housing. Accordingly, the filtering device will operate in a highly reliable manner to assure that the fluid being treated will have all particulate matter removed and will be purified according to the nature of the filter medium 10 contained in the envelope 6.

It should also be noted that in having the tube fixed in the envelope as hereinbefore noted with the upper end thereof projecting above the envelope, there is provided a convenient handle to facilitate insertion and replacement of the filtering envelope. Such removal and replacement readily may be effected upon removing the fitting 16. One of the advantages provided by the filtering envelope is that the material of which the envelope is formed is preferably transparent to enable the user readily to determine if the filter requires replacement, since the appearance of the filtering material noticeably will indicate when replacement is necessary.

Another advantage which is a result of use of a filtering envelope as herein provided is that due to the sealing action of the wall of the envelope with the wall of the housing, when the envelope has become fully used and is to be removed, the exterior thereof is free from slime and foreign matter.

While the intake and discharge filtering members may, of course, vary as to form, porosity, and material used according to the particular gaseous or liquid fluid to be treated, it has been found in the instance of the intake filtering member 11 that excellent filtering action free from clogging will be afforded if the member is comprised of a number of filtering elements in sandwich form. For example, a plurality of cloth or similar filtering elements 11a are sandwiched between rigid porous filtering elements 11b which may be molded of plastic or similar material. The filtering action of such a composite filtering member is effective over longer periods than when the cloth filtering elements are mounted back to back, since clogging of the filter member is avoided by the arrangement as here provided.

The discharge filter member 7 may be of any suitable form provided it has less porosity and a slower filtering action than the filtering member 11.

With reference to FIG. 2, it will be seen that an envelope generally designated 25 corresponding to the envelope 6 except for the presence of the discharge tube 19, may be mounted to provide a flow-through filter device in a housing 26 which has an intake fitting 27 detachably mounted on one end for intaking fluid to be filtered and treated and an outlet fitting 28 detachably mounted on the other end. In this form of the invention the intake filtering member 29 and the discharge filtering member 30 may be of the same formation as the elements 7 and 11 shown in FIG. 1, except for the presence of the discharge tube. The filtered fluid enters the chamber 31 opposite the filter member 30 and passes out through discharge port 32. In this form of the invention the filtering material 33 in the envelope is impacted and displaced for effecting a seal between the envelope and the housing in the same manner and under the same circumstances as described in connection with the device shown in FIG. 1.

In view of the fact that the intake filtering member 7 and the filtering medium in the envelope in the forms of the invention shown in FIGS. 1 and 2 will effect a thorough filtering and purification treatment of the fluid, it has been found that it is possible to efficiently use in connection with the discharge filtering element a filter element 35 as shown in FIG. 3 that is capable of filtering out particulate matter of one micron and above. FIG. 3 shows a composite filter member 36 which includes the element 35, as it would appear when mounted in a flow-through type of filter device as shown in FIG. 2. However, it should be noted that the filtering element 35 may be used in connection with the discharge tube type of filter device shown in FIG. 1, in which case the filtering element 35 would have an opening therethrough and would be fixed to the tube in any suitable manner in sealed engagement therewith. Best results are achieved by having the element 35 sandwiched between two filtering disks 37 and 38 of the fine porosity characteristics similar to that shown in FIG. 1 to thereby form the composite filtering member 36. With this arrangement, effective use of the filter member 36 for removing particulate matter from liquid and gaseous fluids will be possible over long periods of time without impairment thereof.

With reference to the foregoing description and the accompanying drawing, it will now be apparent that a filter device embodying the present invention will provide the advantages and serve the purposes herein noted in a particularly efficacious manner, due primarily to the construction and arrangement of the flexible filtering envelope having the filtering members sealed therein for relative axial movement and which confine therebetween the body of a filtering medium capable of being compacted and laterally displaced in response to the relative axial movement of the filtering members as effected by pressure of the fluid being directed to the envelope.

While specific structural details have been shown and described, it should be understood that changes and alterations may be resorted to without departing from the spirit of the invention as defined in the appended claims.

I claim:

1. A filter device comprising: a tubular envelope formed of flexible and impervious material; intake and discharge filtering members mounted in said envelope in sealed engagement therewith; a filtering medium enclosed in said envelope between said filtering members; said filtering medium being capable of being impacted and laterally displaced in said envelope in response to axial compression thereof; a housing having a bore in which said envelope is mounted with said intake filtering member subject to axial movement for impacting and laterally displacing said medium; said envelope having at least a portion of its surrounding wall disposed for movement laterally into circumferential sealing engagement with the wall of said bore; means connected with said housing for directing against said intake filtering member the fluid under pressure that it is desired to pass through said intake filtering member, said filtering medium, and said discharge filtering member; and means for discharging from said housing the fluid that has passed through said envelope.

2. The filter device as set forth in claim 1 wherein said envelope has a circumferential end portion extending outwardly beyond said intake filter member for sealing against the wall of the bore of the housing in response to pressure of fluid directed against said intake filtering member.

3. The filter device as set forth in claim 1 wherein the intake filtering member is movable axially in said bore in response to a greater fluid pressure exteriorly of said intake filtering member than internally thereof.

4. The filter device as set forth in claim 1 wherein said means for discharging filtered fluid from said housing includes a discharge tube extending through said envelope with its ends open at the exterior of said intake and discharge filtering members.

5. The filter device as set forth in claim 1 wherein said filtering medium is in the form of an activated carbon filling the space within said envelope between said intake and discharge filtering members.

6. The filter device as set forth in claim 1 wherein the material forming said envelope is transparent.

7. The filter device as set forth in claim 1 wherein the material forming said envelope consists of a plastic capable of being stretched laterally in response to lateral displacement of said filtering medium.

8. The filter device as set forth in claim 1 wherein said envelope is provided with a cross sectional shape corresponding to that of said bore.

9. The filter device as set forth in claim 1 wherein said intake filtering member is movable relative to said discharge filtering member responsive to differential fluid pressures across said intake filtering member.

10. The filter device as set forth in claim 1 wherein said envelope is removable from said housing upon removal of said means for introducing fluid under pressure against said intake filtering element.

11. The filter device as set forth in claim 1 wherein said envelope is provided with means for spacing said discharge filtering member from an end of said housing.

12. The filter device as set forth in claim 1 including means interposed between an end of said housing and said discharge filtering member for maintaining a space between said end of said housing and said envelope.

13. A filter element comprising: a tubular envelope formed of flexible and impervious material; intake and discharge filtering members mounted interiorly of said envelope for relative axial movement and to form axially space seals therewith; and a filtering medium confined in envelope between said filtering members; said filtering medium being subject to being compacted and laterally displaced to laterally extend portions of the envelope in response to relative axial movement of said filtering members.

14. The filtering element as set forth in claim 13 including a tubular member extending axially through said filtering medium in said envelope and through and in sealing contact with said filtering members; said tubular member being immovably fixed to said discharge filtering member; and said intake filtering member being movable axially of said tubular member.

15. A filter device comprising: a flexible, tubular envelope having an intake and a discharge end; a filtering medium in said envelope; said filtering medium being capable of being impacted and laterally displaced therein in response to axial compression thereof in said envelope; intake and discharge filtering members fixed to said envelope in sealed engagement therewith within said ends to retain said medium in said envelope; a housing open at one end and closed at the other end; said housing having a bore of a cross sectional shape corresponding to that of said envelope and in which said envelope is mounted with said discharge end adjacent said closed end of said housing and its surrounding wall disposed for movement laterally to circumferentially, sealingly engage the wall of said bore; a discharge tube extending axially through said filtering member and said envelope with its ends protruding beyond said filtering members; said envelope having its intake end portion extending freely above said intake filtering member operable to form a seal against the wall of said bore above said intake filtering member; means in said housing between said closed end thereof and one end of said tube maintaining in the housing a space permitting fluid discharging through the discharge filtering member to enter one end of said discharge tube; means connected with the open end of said housing for directing against said intake filtering member fluid under pressure to pass the fluid therethrough into said envelope; said intake filtering member being operable incident to development of differential pressures on opposite sides thereof to move axially toward said filtering medium to compact and laterally displace said filtering medium and thereby force said surrounding wall of the envelope into sealing contact with the wall of said bore.

References Cited by the Examiner

UNITED STATES PATENTS

| | | | |
|---|---|---|---|
| 178,972 | 6/1876 | Stewart | 210—266 X |
| 2,072,393 | 3/1937 | Brigg | 210—287 |
| 2,278,488 | 4/1942 | Ralston | 210—282 |
| 2,630,227 | 3/1953 | Rodwell | 210—282 X |
| 2,672,984 | 3/1954 | Russell | 210—282 |
| 2,742,155 | 4/1956 | Sather | 210—97 |
| 2,770,317 | 11/1956 | Bottum | 210—282 X |
| 3,152,077 | 10/1964 | Kryzer | 210—288 X |

FOREIGN PATENTS 1,262,641  4/1961  France.

REUBEN FRIEDMAN, *Primary Examiner.*

D. M. RIESS, *Examiner.*